(12) United States Patent
Edwards (10) Patent No.: US 9,836,626 B1
(45) Date of Patent: Dec. 5, 2017

(54) PAYMENT CARD DETECTION FOR CARD READER

(71) Applicant: Square, Inc., San Francisco, CA (US)

(72) Inventor: Troy Edwards, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/322,824

(22) Filed: Jul. 2, 2014

(51) Int. Cl.
*G06Q 30/00* (2012.01)
*G06Q 50/00* (2012.01)
*G06K 7/01* (2006.01)
*G06K 7/08* (2006.01)
*G06K 7/00* (2006.01)
*G06Q 20/34* (2012.01)

(52) U.S. Cl.
CPC ............. *G06K 7/01* (2013.01); *G06K 7/0069* (2013.01); *G06K 7/082* (2013.01); *G06Q 20/353* (2013.01)

(58) Field of Classification Search
None
See application file for complete search history.

(56) References Cited

U.S. PATENT DOCUMENTS

| | | | | |
|---|---|---|---|---|
| 2011/0087596 A1* | 4/2011 | Dorsey | ................. | G06Q 20/32 705/44 |
| 2012/0091200 A1* | 4/2012 | McKelvey | ........... | G06Q 20/322 235/380 |
| 2012/0091201 A1* | 4/2012 | Babu | .................... | G06Q 20/322 235/380 |
| 2012/0095857 A1* | 4/2012 | McKelvey | ........... | G06Q 20/204 705/17 |
| 2012/0095914 A1* | 4/2012 | McKelvey | ............. | G06Q 20/10 705/44 |

\* cited by examiner

*Primary Examiner* — Fateh M Obaid
(74) *Attorney, Agent, or Firm* — Polsinelli PC (57) ABSTRACT

Aspects of the technology provide a card reader for facilitating a financial transaction between a buyer and a merchant. In some implementations, the card reader includes an audio plug configured to provide a communicative coupling between the card reader and a smartphone device, and a read head communicatively coupled to the audio plug, the read head being configured to read financial information from a payment card for processing a transfer of funds from the buyer to the merchant. In certain implementations, the card reader further includes a switch coupled to the audio plug, wherein the switch is configured to close in response to the presence of the payment card to enable communication between the card reader and the smartphone via the audio plug.

16 Claims, 9 Drawing Sheets

PAYMENT CARD DETECTION FOR CARD READER

BACKGROUND

1. Technical Field

The subject application relates to a financial payment card reader and in particular systems and methods for connecting and disconnecting a card reader device to/from a mobile host based on a presence/absence of a financial payment card.

2. Introduction

The increasing prevalence of mobile computing devices, such as smartphones and tablet computers has spurred an increase in popularity for attachable peripheral devices. In some implementations, an attachable card reader can be used in conjunction with a host device, such as a smartphone, e.g., for use as a mobile point-of-sale (POS) terminal. In some such configurations, the card reader can be coupled to the smartphone by inserting a plug of the card reader into a headphone port of the smartphone.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it is clear and apparent that the subject technology is not limited to the specific details set forth herein and may be practiced without these specific details. In some instances, structures and components are shown in block diagram form in order to avoid obscuring the concepts of the subject technology.

In some conventional card reader implementations, a card reader attachment is supported by a host device, such as a smartphone. In some configurations, the card reader is coupled to the smartphone via a headphone port such that physical and communicative coupling is accomplished by fitting a male-type audio plug of the card reader into a female-type headphone port of the smartphone.

Although, such communicative couplings enable communication between the card reader and the software/hardware of the supporting host device, the coupling of the card reader with a headphone port can cause changes in the audio signal routing of the host device. Namely, audio signals normally routed to a device speaker, such as an ear piece, are instead routed through the headphone port, for example, to facilitate headphone attachment or "hands-free" operation of the smartphone. That is, in most conventional smartphone/reader attachment configurations, attachment of the card reader prevents "normal" operative use of the smartphone (e.g., to make/receive calls) because attachment of the card reader causes the smartphone to behave as if a headphone were attached. As a result, when using conventional card reader attachments, the card reader must be removed/reattached as the user switches between various uses of the smartphone, e.g., as a communication device (cellular phone) and as a host device for supporting a mobile point-of-sale (POS) system.

Aspects of the subject technology address the foregoing limitations by providing an improved card reader that automatically connects (and disconnects) with the smartphone, depending on whether a financial payment card is present (e.g., indicating that the card reader attachment is required to utilize card reader functionality). More specifically, card reader enhancements are provided that enable an attachable card reader to become (automatically) communicatively coupled to a smartphone upon receipt of a mobile payment card, and likewise to automatically disconnect from the smartphone when a payment card is not present, thereby permitting normal operation of the smartphone. In this manner, a user can access the functionality of an attachable card reader when needed, and resume standard use of the smartphone (e.g., to make call, etc.), without the need to physically couple/de-couple the card reader between uses.

In certain aspects, card reader enhancements can include the addition of a normally-open switch into the communication path between the card reader and the smartphone e.g., on the audio channel or audio plug of the card reader. The normally-open switch serves to prevent the card reader from electrically engaging with the smartphone until closure of the switch is caused, e.g., in response to financial payment card insertion into the card reader. As discussed in further detail below, insertion of financial payment card into a card slot of the card reader causes the switch to close, connecting the card reader to the smartphone to enable communication between the card reader and smartphone. Likewise, removal of the financial payment card from the card reader permits the normally open switch to return to an "open" position, electrically disengaging the smartphone and permitting normal telephone operation.

Figure 1A:
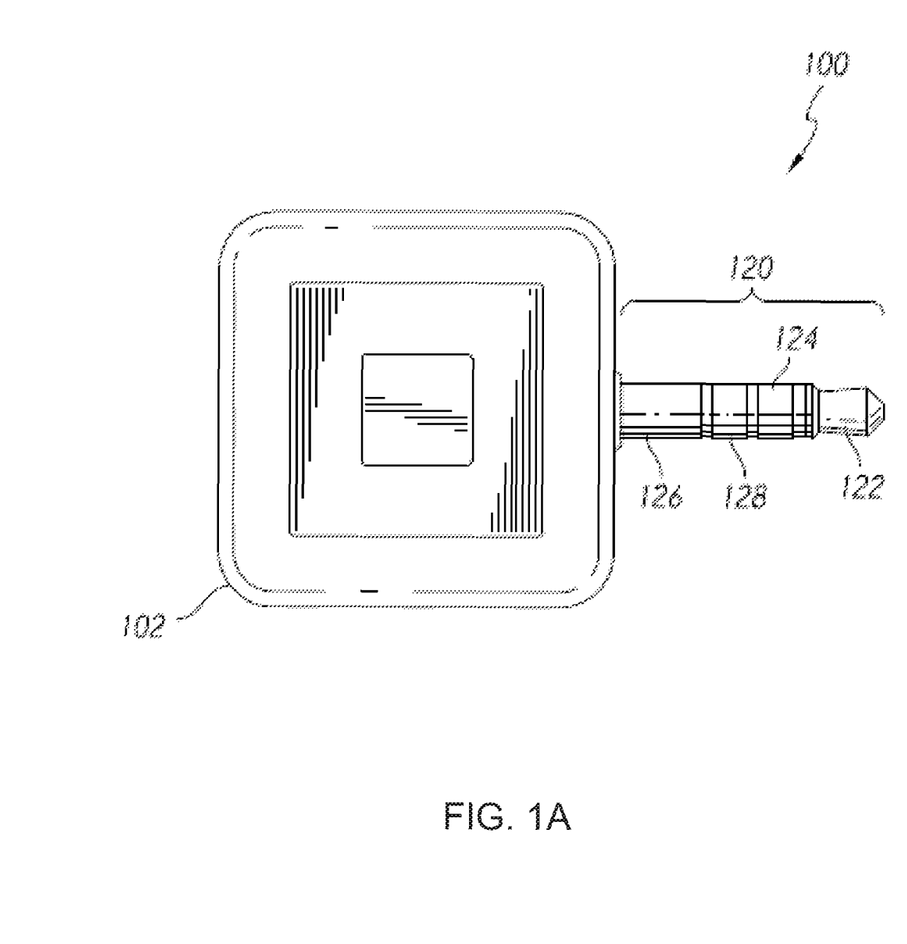
FIG. 1A illustrates an example of a perspective view of a removable card reader device, including an audio plug, according to some aspects of the subject technology.

FIG. 1A illustrates an example of card reader 100, including audio plug 120, according to some implementations. Card reader 100 includes reader hardware 102 coupled to audio plug 120, e.g., to enable card reader 100 to become coupled to a headphone port of a host device (not illustrated).

Audio plug 120 can be differently configured, depending on the preferred implementation. In FIG. 1A, audio plug 120 includes multiple conductive regions for making electrical contact with a host device, such as a smartphone or tablet computing device. Specifically, audio plug 120 includes tip 122, first ring 124, second ring 128, and sleeve 126.

In some implementations, tip 122 corresponds with a left audio channel; first ring 124 corresponds with a right audio channel, second ring 128 corresponds with an electrical ground, and sleeve 126 corresponds with a microphone line. As discussed in further detail below, the microphone channel of audio plug 120 can be used to provide financial payment card data from card reader 100 to a smartphone (not illustrated). Additionally, in some implementations, sleeve 126 can be used to draw current from a microphone channel of the host device, for example, to provide power to one or more hardware modules of card reader 100.

Figure 1B:
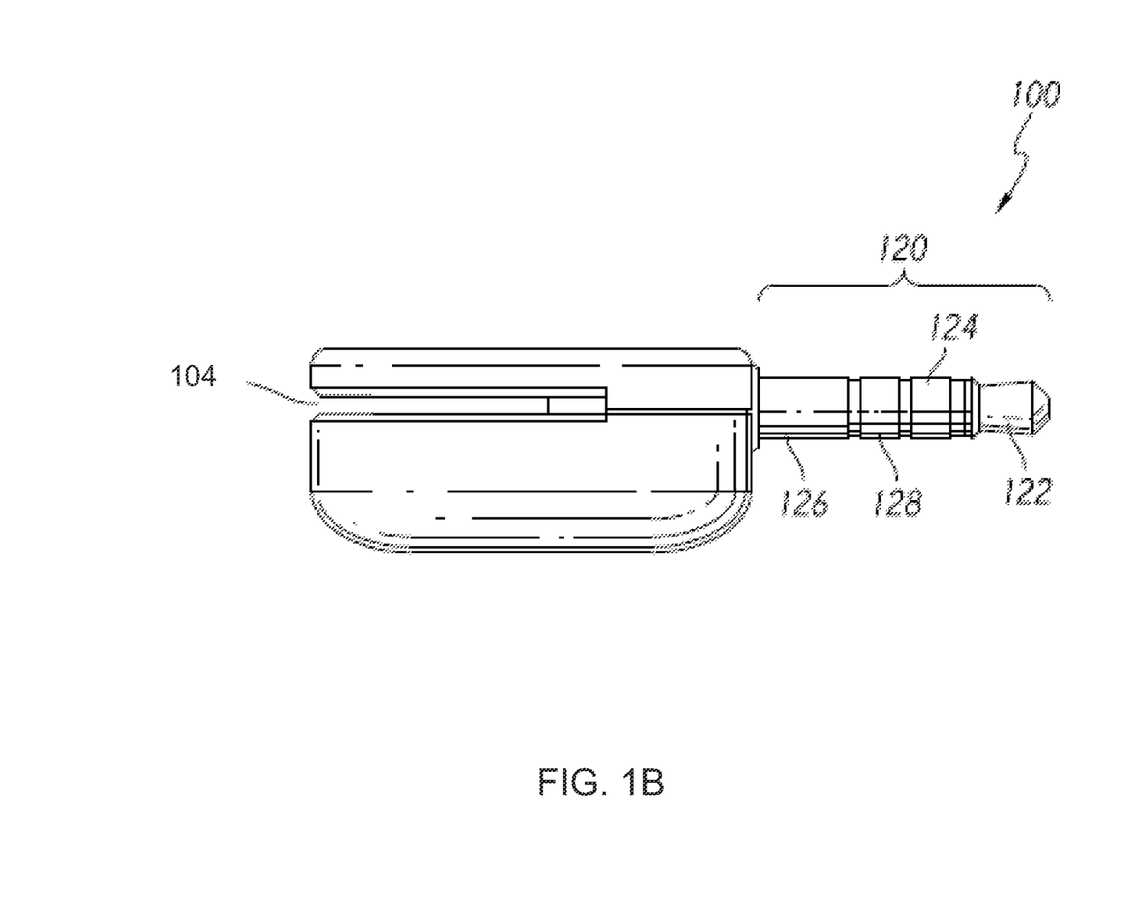
FIG. 1B illustrates an example of a side perspective view of a removal card reader, including a card slot for accepting financial payment cards, according to some implementations.

FIG. 1B illustrates a side perspective view of card reader 100, according to some implementations. In this view, card reader 100 is shown to include card slot 104, which can be configured for receiving various types of financial payment cards e.g., for reading by reader hardware 102. By way of example, card slot 104 can be adapted to receive magnetic stripe payment cards and/or integrated circuit (IC) payment cards, such as those conforming to the Europay, MasterCard and Visa (EMV) standard.

Figure 1C:
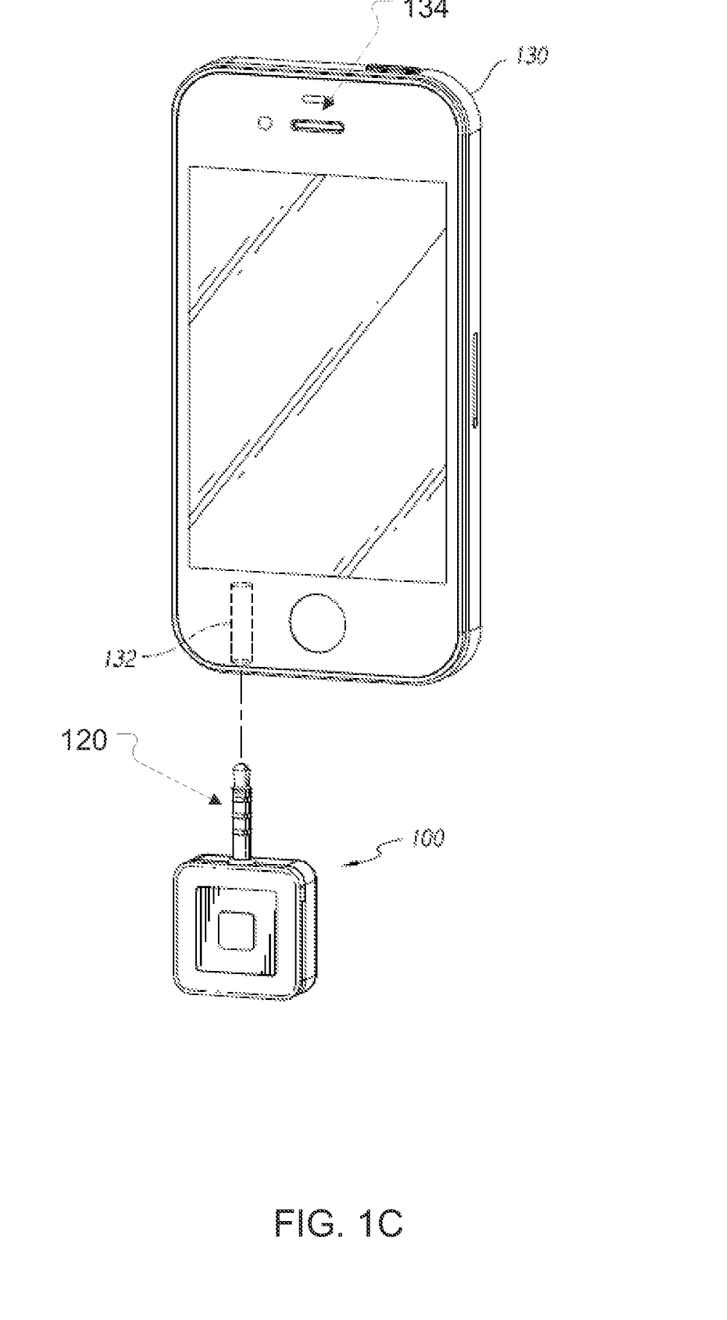
FIG. 1C illustrates an example of a coupling between a card reader and a mobile computing device i.e., a smartphone, according to some implementations of the technology.

FIG. 1C illustrates an example of the electrical and physical coupling of card reader 100 and host device 130, using plug 120, according to some implementations. In the example of FIG. 1C, host device 130 is a smartphone; however, it is understood that host device 130 can be any processor-based mobile device that is capable of receiving financial payment information and communicating the same with an outside verification service necessary to consummate a financial transaction.

In FIG. 1C card reader 100 is shown to physically and electrically couple with host device 130 via headphone port 132. However, it is understood that other means of communication between card reader 100 and host device 130 may be employed, without departing from the scope of the technology. As discussed above, in implementations where card reader 100 is supported by a smartphone, such as host device 130, operation of the smartphone can be affected by the coupling of card reader 100 with headphone port 132. That is, normal smartphone operation, whereby audio output signals are routed to a speaker such as ear piece 134, is altered such that audio output signals are provided to headphone port 132. However, in instances where normal smartphone operation is desired, for example, while card reader 100 is physically coupled to host device 130, it is necessary to disengage the electrical coupling between card reader 100 and host device 130. To address the foregoing problem with conventional reader implementations, card reader 100 can be configured to detect insertion (or dipping) of a financial payment card, causing electrical engagement between card reader 100 and host device 130.

Detection of the presence of a financial payment card can be accomplished using a switch, such as a normally-open switch disposed within card slot 104 of reader 100. In practice, a normally-open switch can be configured to control electrical closure of the microphone channel of audio plug 120, in turn, controlling an electrical connection between the card reader and smartphone, independent of the physical coupling. As a result, the card reader can become automatically connected to the smartphone (e.g., for use as a POS terminal), and again become automatically disconnected, permitting normal smartphone operation, e.g., when no payment card is detected.

While the examples illustrated in FIGS. 1A-1C illustrate a removable card reader attachment, it is understood that various card readers may be implemented. For example, a card reader may be integrated with a case, such a protective case for a smartphone, without departing from the scope of the invention.

Figure 2A:
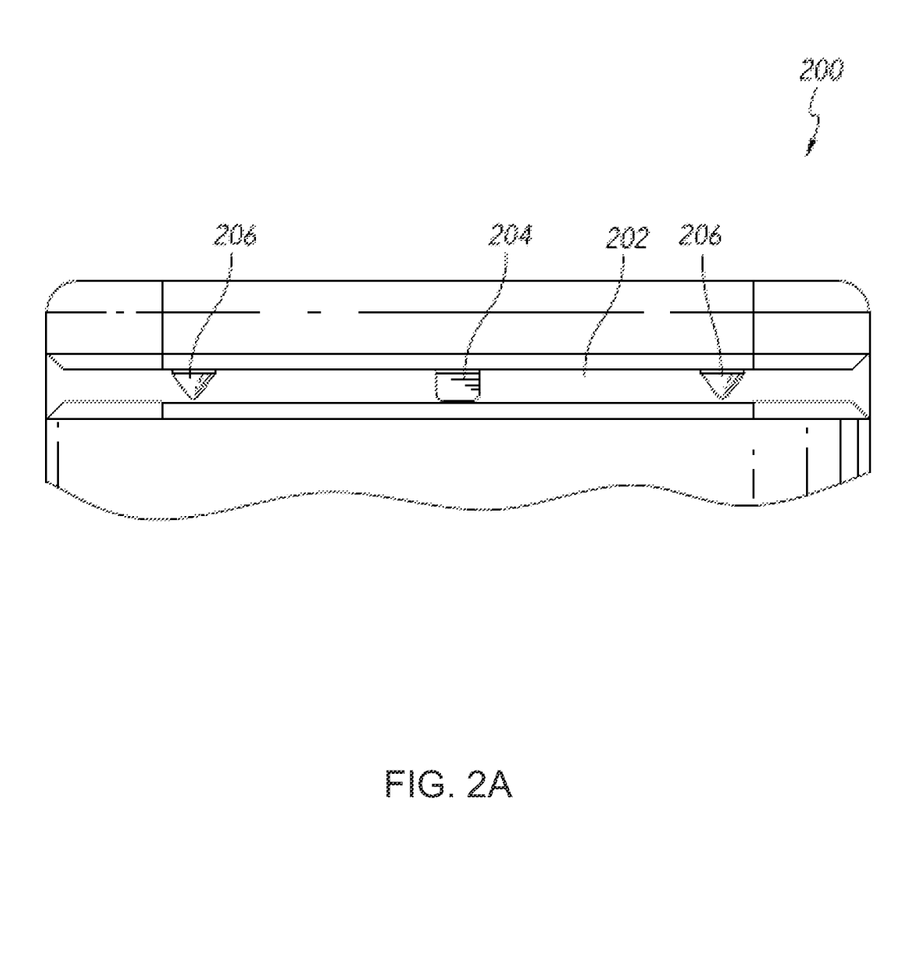
FIG. 2A illustrates an example of a card reader card slot, including a mechanical switch mechanism, according to some aspects.

FIG. 2A illustrates an example of a cutaway perspective of card reader 200, including card slot 202, according to some implementations. In the example of FIG. 2A, card slot 202 includes mechanical switches 206 disposed on both sides of read head 204. It is understood that aspects of the subject technology are not limited by the location and/or type of switch used with card slot 202, and that various switch types and or locations may be implemented, as described in further detail below.

In practice, card reader 200 is able to process a financial payment card upon insertion of the payment card into slot 202, and passage of a corresponding magnetic stripe over read head 204. Similarly, read head 204 may be part of an IC reader, e.g., for reading IC type payment cards, for example, that conform to the EMV standard, discussed above. Switches 206 can include normally 'open' switches that become closed upon displacement, caused by passage of a financial payment card through card slot 202. Electrical closure of (either of) switches 206 completes electrical contact between card reader 200 and a host device, such as host device 130, discussed above. As such, switches 206 are configured to toggle electrical contact via an audio plug, such as plug 120, when reader 200 is coupled to the headphone port of a smartphone device. It is understood that various types of switches can be implemented without departing from the scope of the subject technology.

Figure 2B:
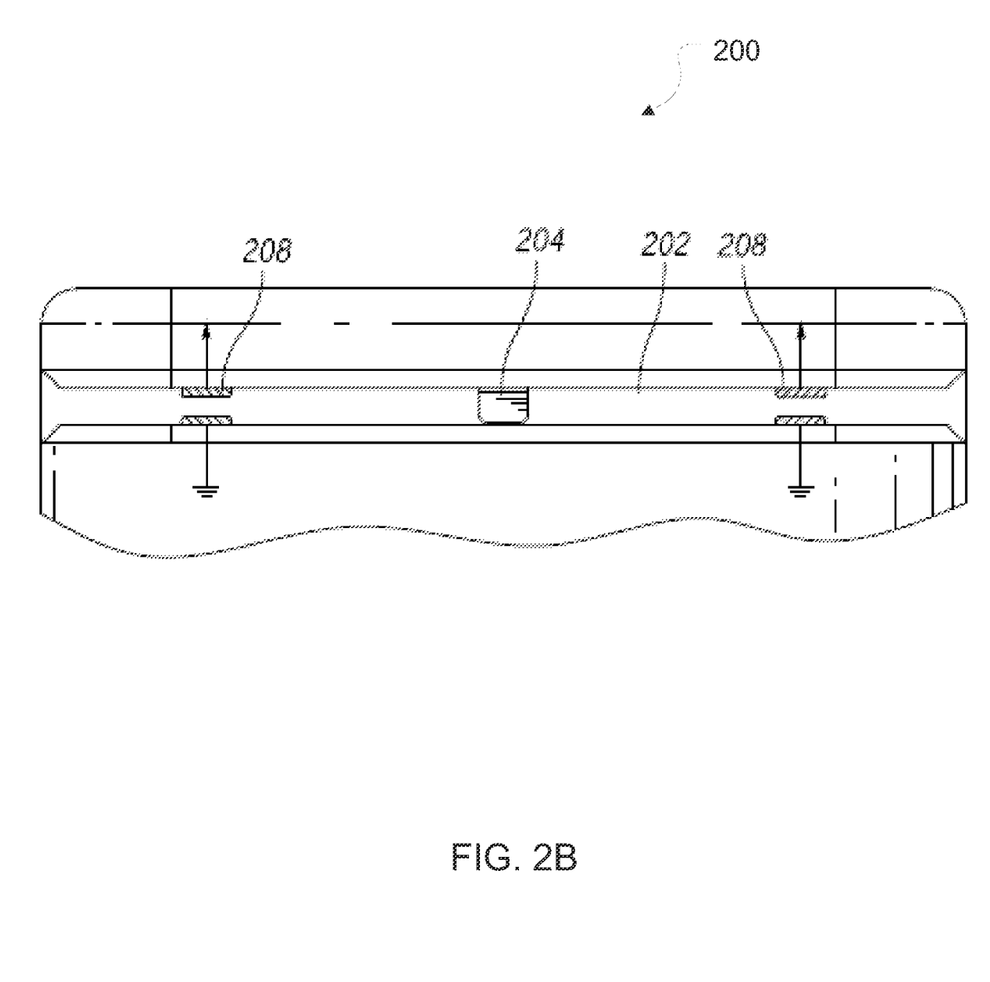
FIG. 2B illustrates an example of a card reader card slot, including a capacitive switch mechanism, according to some aspects.

FIG. 2B illustrates an example of the use of capacitive switches, according to some aspects of the technology. Specifically, FIG. 2B illustrates an example of reader 200 in which card slot 202 includes capacitive switches 208, e.g., on either side of read head 204. As would be appreciated by those of skill in the art, a dielectric constant associated with the absence of an object placed within either of switches 208 can correspond with an 'open' state of capacitive switches 208. Conversely, the insertion of an object, such as the passage of a financial payment card, results in dielectric changes, causing closure of capacitive switches 208 and completing electrical contact between card reader 200 and the host device. Once the financial payment card is removed, and the dielectric is retuned to a dielectric value associated with an absence of the card, capacitive switches 208 reopen, again disconnecting card reader 200 from the host device and permitting normal smartphone operation.

It is understood that read head 204, as depicted in the example of FIG. 2B, may be similarly implemented as either a read head for a magnetic stripe reader or an IC payment card reader, such as that configured to read information from a card conforming to the EMV standard, as discussed above.

Figure 2C:
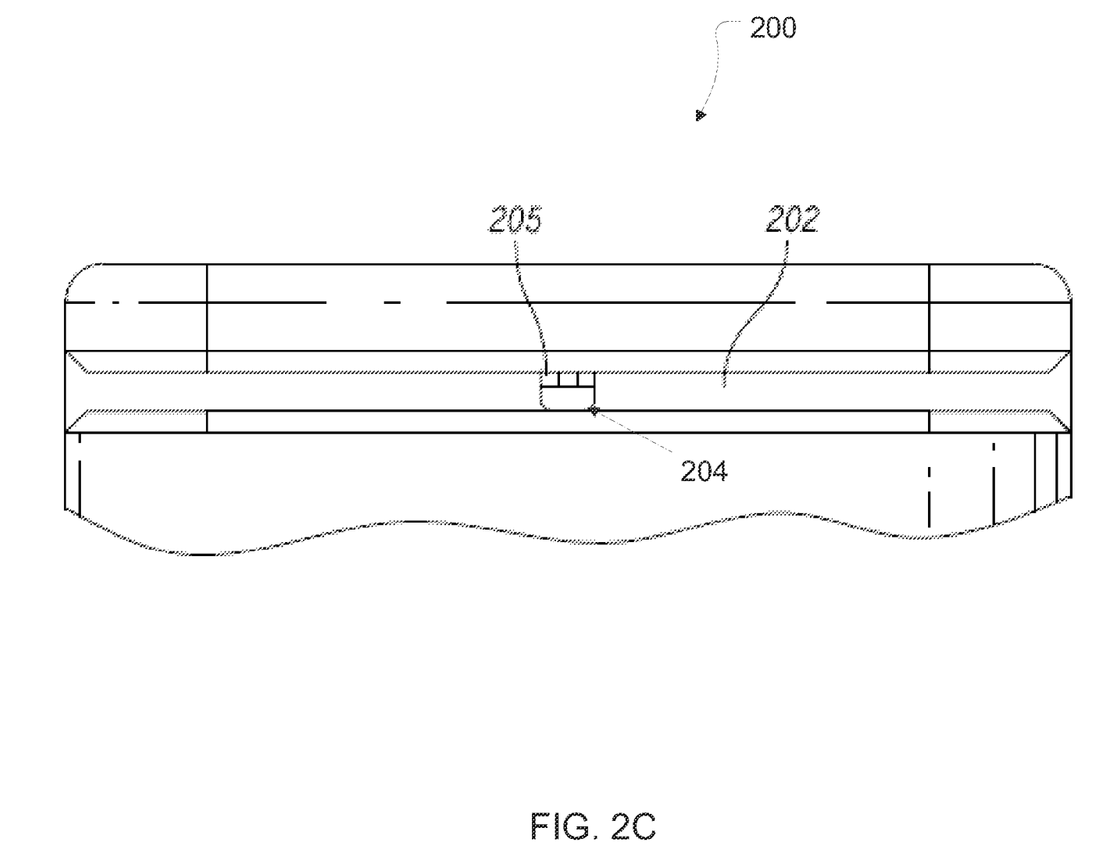
FIG. 2C illustrates an example of a card reader card slot, including a switch mechanism integrated with a read head, according to some aspects.

FIG. 2C illustrates yet another example implementation of a card reader in which a switch 205 is disposed within card slot 202 to detect the presence/absence of a financial payment card. In the example of FIG. 2C, switch 205 includes a mechanical switch coupled with read head 204 (e.g., between read head 204 and a side of the card slot 202), and configured to detect any interaction between a financial payment card and read head 204.

Similar to the examples of FIGS. 2A and 2B, it is understood that read head 204, as depicted in the example of FIG. 2C, may be similarly implemented as either a read head for a magnetic stripe payment card reader and/or an integrated circuit (IC) payment card reader, such as that configured to read information from a card conforming to the EMV standard, as discussed above.

In practice, switch 205 can include physical elements, such as one or more springs configured to displace read head 204 into card slot 202, keeping switch 205 in an 'open' position. Upon physical contact (e.g., of a financial payment card) with read head 204, switch 205 is moved or biased into a 'closed' position (as the financial payment card passes), completing electrical contact between card reader 200 and a host device (not shown). It is understood that integration of one or more switches with read head 204 is not limited to physical switching elements. By way of example, one or more capacitive switches (such as switches 208 discussed above with respect to FIG. 2B) may be integrated with read head 204.

Figure 3A:
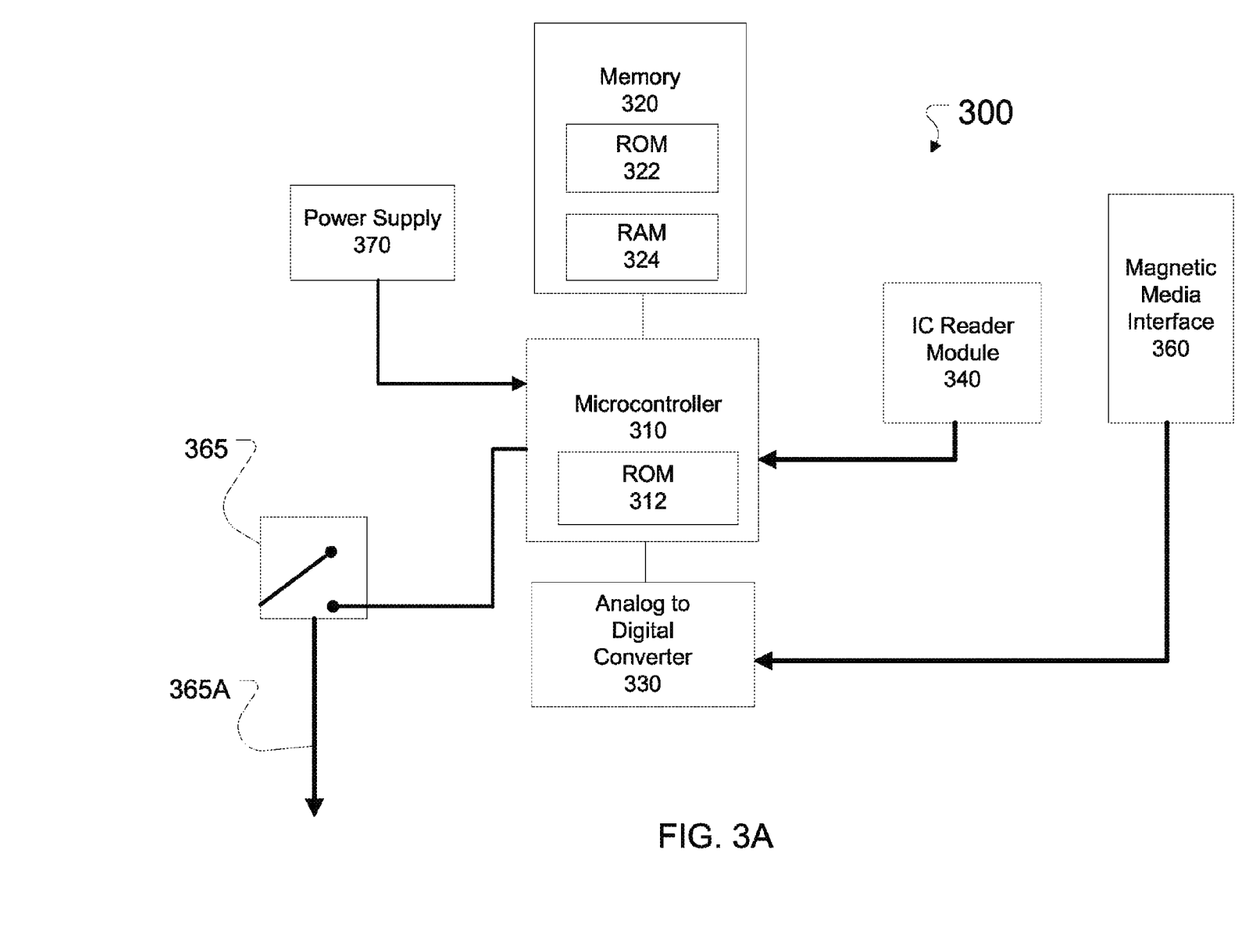
FIGS. 3A and 3B conceptually illustrate a configuration of hardware modules for implementing a card reader, according to some aspects.

FIG. 3A depicts a block diagram of example hardware components that can be used to implement card reader 300. In the example of FIG. 3A, card reader 300 includes microcontroller 310, memory 320, analog-to-digital converter (ADC) 330, IC read module 340, media interface 360, switch 365, and power supply 370.

Microcontroller 310 is coupled to memory 320, power supply 370, and ADC 330. Microcontroller 310 is further coupled to IC read module 340, as well as media interface 360 (e.g., via ADC 330). Additionally, microcontroller 310 is coupled to communication channel 365A via switch 365. As discussed above, communication channel 365A can include an audio plug (e.g., plug 106) for use in providing a communicative link between microcontroller 310 and a host device, such as a smartphone (not illustrated). In some implementations, communication channel 365A is configured to provide electrical/communicative contact with a protruding audio plug (e.g., plug 106), such as a 3.5 mm tip-ring-ring-sleeve (TRRS) connector configured for insertion into the headphone port of a mobile computing device.

In operation, the electrical connection between microcontroller 310 and a host device (e.g., via communication channel 365A), is determined by a state of switch 365. For example, switch 365 can comprise a normally open switch that, unless actuated, prevents an electrical connection between microcontroller 310 and the host device, such as a smartphone or tablet computing device.

In certain aspects, switch 365 is mechanically disposed within a card slot or card track that facilitates reading of a financial payment card, for example, by either IC read module 340 or magnetic media interface 360. That is, switch 365 can include a normally-open switch that closes in response to the detected presence of a financial payment card, for example, upon insertion of the financial payment card into the card slot of the card reader device, such as a dip-slot or magnetic card swipe slot. Additionally, as discussed with respect to FIGS. 2A-2C, payment card detection can be accomplished using a switch (e.g., any of switches 206, 208, and/or 205), to toggle an electrical connection between the card reader and a host mobile device.

Figure 3B:
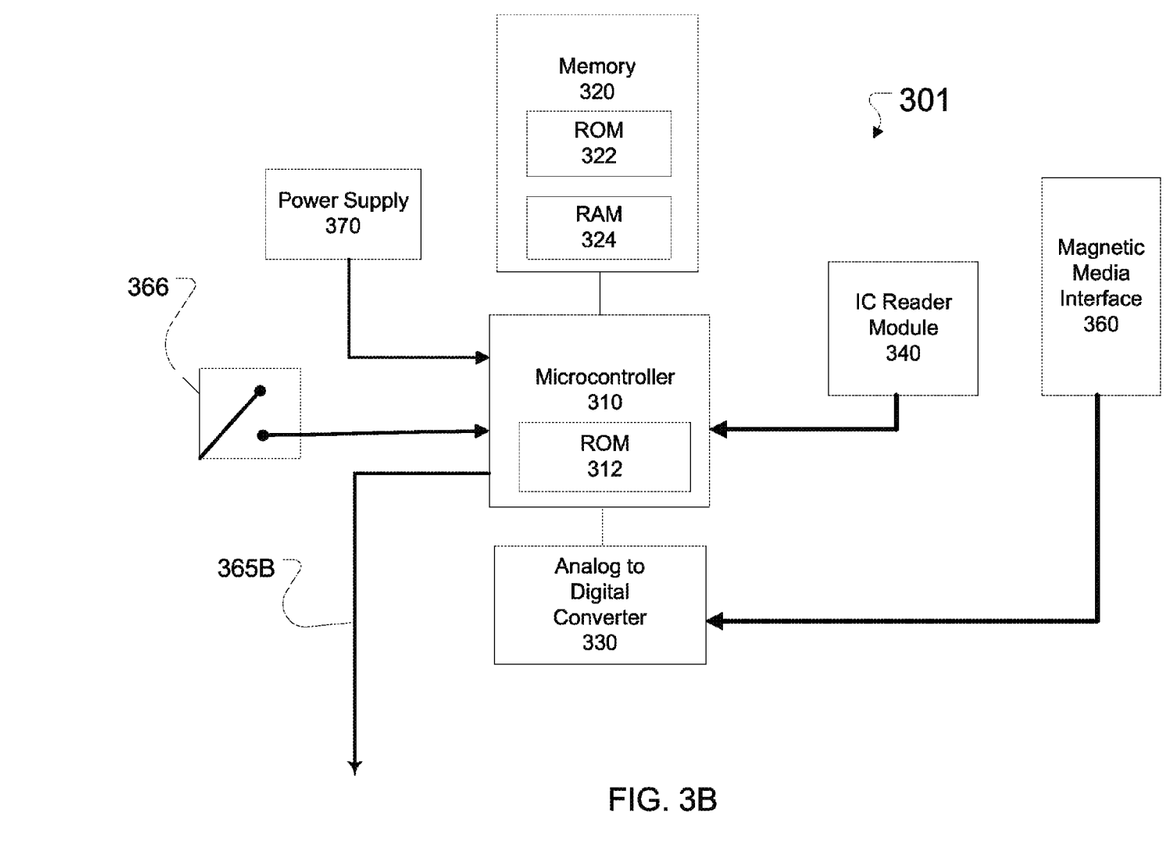

FIG. 3B illustrates yet another example configuration of hardware components that can be used to implement card reader 301, according to aspects of the technology. In the example of FIG. 3B, card reader 301 includes microcontroller 310, memory 320, analog-to-digital converter (ADC) 330, IC read module 340, magnetic media interface 360, switch 366, and power supply 370.

Similar to the example of FIG. 3A, microcontroller 310, as depicted in FIG. 3B, is coupled to memory 320, power supply 370, and ADC 330. Microcontroller 310 is further coupled to IC read module 340, as well as magnetic media interface 360 (e.g., via ADC 330). Additionally, microcontroller 310 is coupled to communication channel 365B and switch 366. Similar to communication channel 365A, discussed above, communication channel 365B can include an audio plug (e.g., plug 106) for use in providing a communicative link between microcontroller 310 and a host device, such as a smartphone or tablet computing device (not illustrated).

In operation, the electrical connection between microcontroller 310 and a host device (e.g., via communication channel 365B), is determined by a state of switch 366. In certain aspects, actuation of switch 366 can be used to provide a signal to microcontroller 310, for example, to indicate actuation of switch 366, which can correspond with insertion of a payment card into a card slot. In turn, the signal provided to microcontroller 310 can be used by microcontroller 310 to control connectivity between card reader 301 and a host device, e.g., via communication channel 365B.

Depending on implementation, a decision to connect to (or disconnect from) a host device, (e.g., via communication channel 365B), can be made by microcontroller 310, based on different criteria. By way of example, the decision (by microcontroller 310) to connect/disconnect with a host device may be based primarily on the state of switch 366. In other implementations, other input signals and/or factors may be considered in place of (or in conjunction with) signals indicating a state of switch 366.

Similar to the implementations described with respect to switch 365 in FIG. 3A, switch 366 can be mechanically disposed within a card slot or card track that facilitates reading of a financial payment card, for example, by either IC read module 340 or magnetic media interface 360. That is, switch 366 can include a normally-open switch that closes in response to the detected presence of a financial payment card, for example, upon insertion of the financial payment card into the card slot of the card reader device, such as a dip-slot or magnetic card swipe slot.

It is understood that reader devices 300 and 301 can be implemented using various other hardware components and/or configurations, and are not limited to the architectures depicted in FIGS. 3A and 3B. By way of example, microcontroller 310 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Additionally, reader device 300 and/or 301 can be powered using various means, such as with a charge storage device (e.g., a battery), or powered directly from a host device, such as a smartphone or tablet computing device. That is, power supply 370 can include a battery or other power supply element that is coupled to, or physically bundled with, other various hardware modules of reader device 300/301. Alternatively, power supply 370 can include an interface that enables reader device to draw current directly from a host device, such as a battery of the host device) or from another external power supply (not shown).

Memory 320 can include various types of memories, including working memory in the form of random-access memory (RAM) 324 and read-only memory (ROM) 322.

Additionally, various types of memory can be utilized in place of, or in addition to, memory 320. For example, the one or more sequences of instructions for operating reader device 300 can be stored as software or firmware in a ROM 322 within microcontroller 310 or in the ROM 322 within memory 320. One or more sequences of instructions can also be software stored and read from another storage medium, such as the flash memory array, or received from the host computing device (e.g., a mobile device such as a smartphone or tablet computing device) via a host interface. ROM, storage mediums, and flash memory arrays represent examples of machine or computer readable media storing instructions/code executable by microcontroller 310. Machine or computer readable media may generally refer to any medium or media used to provide instructions to microcontroller 310, including both volatile media, such as dynamic memory used for storage media or for buffers within microcontroller 310, and non-volatile media, such as electronic media, optical media, and magnetic media.

Magnetic media interface 360 can form a device, or portion thereof, for reading media located on credit cards, debit cards, or objects to obtain payment information. In some implementations, magnetic media interface 360 can be configured to read information from a physical storage medium, such as magnetic storage media (e.g., magnetic stripe media). However, in other implementations, magnetic media interface 360 may be configured for reading other types of electrical or magnetic media.

Similarly, IC read module 340 can be configured for reading integrated circuits, and in particular, embedded chips and/or circuitry used to implement data storage in financial payment cards, such as IC payment cards.

Figure 4:
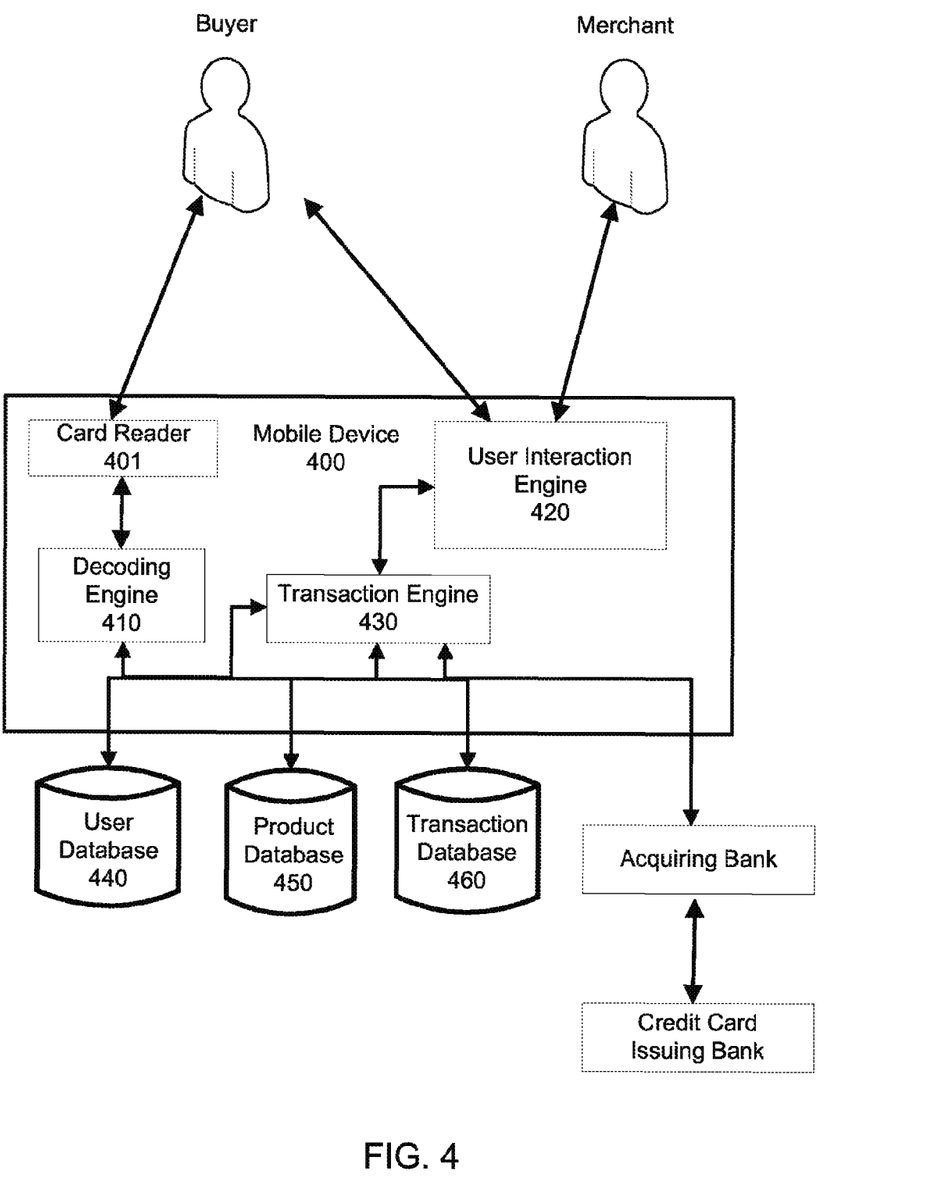
FIG. 4 conceptually illustrates an example environment in which a card reader of the subject technology can be used to facilitate a financial transaction between a buyer and a merchant.

FIG. 4 illustrates an example environment in which a case and card reader may be used. It will be apparent that the components portrayed in FIG. 4 can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a reader 401 connected to mobile device 400, a decoding engine 410, a user interaction engine 420, and a transaction engine 430, all running on mobile device 400. Additionally, the system may also include one or more of a user database 440, a product or service database 450, and a transaction database 460, all coupled to the transaction engine 430.

Consistent with aspects of the subject technology, reader 401 can be physically integrated into a case, such as that discussed above with respect to FIGS. 1A-C, which contains or surrounds mobile device 400.

As used herein, the term engine can refer to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically involves the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, reader 401 is configured to read data encoded in either a magnetic strip (or IC) of a card being swiped by a buyer and send a signal that corresponds to the data read to mobile device 400. However, as discussed above, reader 401 is configured to receive various payment card types, including but not limited to IC cards that can be provided to reader 401 using a dip-slot.

The size of reader 401 can be miniaturized to be portable for connection with mobile device 400. For example, the size of card reader 401 can be miniaturized to an overall length of less than 1.5". In addition, the miniaturized card reader 401 is also designed to reliably read the card with minimum error via a single swipe by counteracting vendor specific filtering done by mobile device 400. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A payment card reader, comprising:
   a card slot of the payment card reader;
   a read head of the payment card reader disposed within the card slot, wherein the read head is configured to read financial information from a payment card in response to receipt of the payment card into the card slot; and
   an electrical switch of the payment card reader, wherein the electrical switch is in an open state preventing a communication path between the payment card reader and a host computing device before receipt of the payment card into the card slot, wherein the electrical switch is changed to a closed state to enable the communication path between the payment card reader and the host computing device in response to receipt of the payment card into the card slot, and wherein the electrical switch automatically returns to the open state after use of the payment card reader.

2. The payment card reader of claim 1, further comprising:
   an audio plug coupled to the payment card reader, wherein the electrical switch is coupled to the audio plug and configured to change to the closed state in response to receipt of the payment card into the card slot, thereby enabling the communication path between the payment card reader and the host computing device via the audio plug.

3. The payment card reader of claim 1, further comprising:
   a plug coupled to the payment card reader; and
   a microcontroller coupled to the plug and to the electrical switch, wherein the electrical switch is configured to provide a switch signal to the microcontroller in response to an insertion of the payment card into the card slot, and wherein the microcontroller is configured to enable the communication path between the payment card reader and the host computing device via the plug based at least in part on the switch signal.

4. The payment card reader of claim 3, wherein the microcontroller is configured to enable the communication path between the payment card reader and the host computing device via the plug based at least in part on an additional input received in addition to the switch signal.

5. The payment card reader of claim 1, wherein the card slot is configured to receive a magnetic stripe payment card.

6. The payment card reader of claim 1, wherein the card slot is configured to receive an integrated-circuit (IC) payment card.

7. The payment card reader of claim 1, wherein the read head disposed within the card slot is configured to read the financial information from a magnetic stripe of the payment card.

8. The payment card reader of claim 1, wherein the read head disposed within the card slot is configured to read the financial information from an integrated-circuit (IC) of the payment card.

9. The payment card reader of claim 1, wherein the electrical switch is a mechanical switch configured to be actuated by the payment card upon swiping of the payment card through the card slot, the payment card having a magnetic stripe.

10. The payment card reader of claim 1, wherein the electrical switch is a mechanical switch configured to be actuated by the payment card in response to a dipping of the payment card into the card slot, the payment card having an integrated-circuit (IC).

11. The payment card reader of claim 1, wherein the electrical switch is integrated with the read head, and wherein the electrical switch is configured to switch into the closed state in response to a displacement of the read head in response to an adjacent passage of the payment card within the card slot.

12. The payment card reader of claim 1, wherein the electrical switch is a capacitive switch configured to be toggled into the closed state upon passage of the payment card through the card slot.

13. The payment card reader of claim 3, wherein the microcontroller is further configured to disable the communication path between the payment card reader and the host computing device via the plug based at least in part on the switch signal.

14. The payment card reader of claim 3, wherein the microcontroller is further configured to disable the communication path between the payment card reader and the host computing device via the plug based at least in part on an additional input received in addition to the switch signal.

15. The payment card reader of claim 1, wherein the communication path between the payment card reader and the host computing device is an electrical connection.

16. A method comprising:
   preventing a communication path between a payment card reader and a host computing device via an electrical switch in an open state;

receiving a payment card via a card slot of the payment card reader;
triggering the electrical switch from the open state to a closed state in response to receipt of the payment card via the card slot;
enabling the communication path between the payment card reader and the host computing device in response to the triggering of the electrical switch from the open state to the closed state;
reading financial information from the payment card via payment medium reading circuitry of the payment card reader in response to receipt of the payment card via the card slot; and
returning the electrical switch from the closed state back to the open state after use of the payment card reader.

* * * * *